United States Patent
Watanabe et al.

(10) Patent No.: US 10,404,200 B2
(45) Date of Patent: Sep. 3, 2019

(54) AC-ROTATING-ELECTRIC-MACHINE CONTROL APPARATUS

(71) Applicant: Mitsubishi Electric Corporation, Tokyo (JP)

(72) Inventors: Masutaka Watanabe, Tokyo (JP); Keiichi Enoki, Tokyo (JP); Yasukazu Murata, Hyogo (JP); Yoshimasa Nishijima, Tokyo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/540,288

(22) PCT Filed: May 11, 2015

(86) PCT No.: PCT/JP2015/063422
§ 371 (c)(1),
(2) Date: Jun. 28, 2017

(87) PCT Pub. No.: WO2016/181448
PCT Pub. Date: Nov. 17, 2016

(65) Prior Publication Data
US 2018/0006593 A1    Jan. 4, 2018

(51) Int. Cl.
*H02P 27/00* (2006.01)
*H02P 25/22* (2006.01)
(Continued)

(52) U.S. Cl.
CPC ............ *H02P 25/22* (2013.01); *H02P 5/74* (2013.01); *H02P 23/30* (2016.02); *H02P 27/08* (2013.01); *H02P 2201/03* (2013.01)

(58) Field of Classification Search
CPC combination set(s) only.
See application file for complete search history.

(56) References Cited

U.S. PATENT DOCUMENTS

| | | |
|---|---|---|
| 6,847,186 B1 * | 1/2005 | Kerlin .................. H02K 99/20 318/747 |
| 2013/0328514 A1 | 12/2013 | Funaba et al. |
| 2014/0292286 A1 * | 10/2014 | Tabata .................. B60R 16/03 322/91 |

FOREIGN PATENT DOCUMENTS

| JP | 2003-274694 A | 9/2003 |
|---|---|---|
| JP | 2005-253213 A | 9/2005 |
| JP | 5433608 B2 | 3/2014 |

OTHER PUBLICATIONS

Communication dated Sep. 26, 2017, from the Japanese Patent Office in counterpart application No. 2017-517473.
(Continued)

*Primary Examiner* — Muhammad S Islam
(74) *Attorney, Agent, or Firm* — Sughrue Mion, PLLC; Richard C. Turner

(57) ABSTRACT

An AC-rotating-electric-machine control apparatus includes two or more electric-power conversion circuits that control respective voltages to be applied to the two or more groups of multi-phase armature windings, for each of the two or more groups of multi-phase armature windings; each of the two or more electric-power conversion circuits has two or more switching devices for opening or closing the corresponding group of multi-phase armature windings, for each of the phases; the two or more switching devices are switching-controlled in such a way that opening operation or duty control can be applied to the corresponding group of multi-phase armature windings.

15 Claims, 8 Drawing Sheets

(51) Int. Cl.
*H02P 23/30* (2016.01)
*H02P 27/08* (2006.01)
*H02P 5/74* (2006.01)

(56) References Cited

OTHER PUBLICATIONS

International Search Report for PCT/JP2015/063422, dated Jul. 21, 2015.
Communication dated Jul. 3, 2019 issued by the State Intellectual Property Office of People's Republic of China in counterpart application No. 201580079536.X.

* cited by examiner

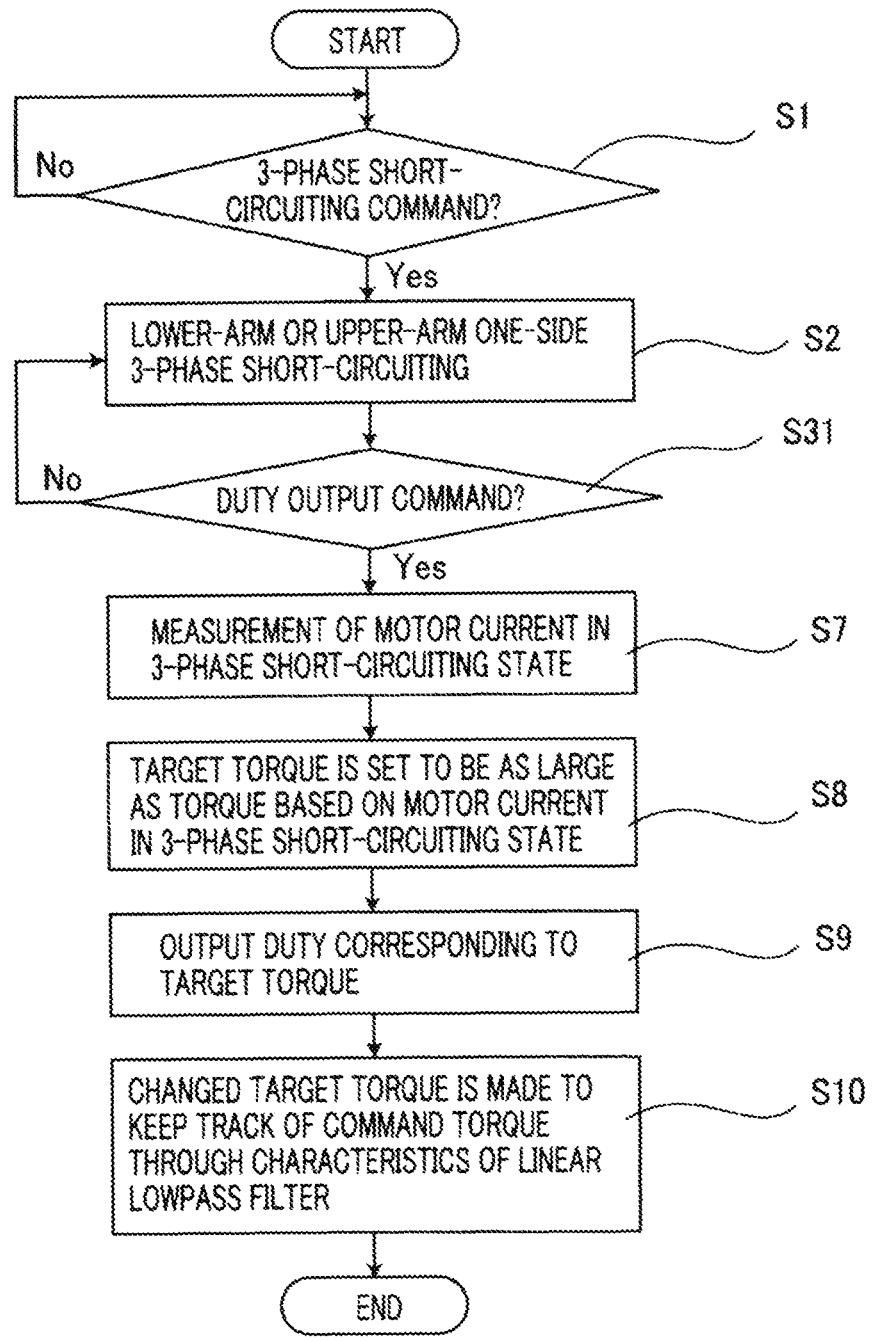

AC-ROTATING-ELECTRIC-MACHINE CONTROL APPARATUS

This Application is a National Stage of International Application No. PCT/JP2015/063422 filed May 11, 2015, the contents of all of which are incorporated herein by reference in their entirety.

TECHNICAL FIELD

The present invention relates to an AC-rotating-electric-machine control apparatus and particularly to an AC-rotating-electric-machine control apparatus that suppresses an excessive voltage of a power-source voltage to be supplied to an AC rotating electric machine.

BACKGROUND ART

As is well known, an electric vehicle such as an electric automobile or a hybrid automobile is equipped with an AC rotating electric machine, as a driving source for the vehicle. An electric power converter connected with the AC rotating electric machine has a first electric-power conversion function for converting DC electric power from a DC power source into AC electric power to be supplied to the AC rotating electric machine and a second electric-power conversion function for converting AC electric power generated by the AC rotating electric machine into DC electric power with which the DC power source is charged. An electric-power conversion circuit formed of a switching device such as a MOSFET (Metal-Oxide-Semiconductor Field-Effect Transistor) is provided in the electric power converter, so that the electric power converter realizes the foregoing electric-power conversion functions. In general, a switching device such as a MOSFET is broken due to a withstanding-voltage breakdown, when a voltage that is higher than a predetermined withstanding voltage is applied thereto. Accordingly, it is required to suppress the voltage to be applied to the switching device from exceeding the withstanding voltage of the switching device.

In recent years, mainly in Europe where gasoline mileage regulations are being strictly strengthened, there has been a technological trend that the voltage of the power source system of a vehicle is set to 48 [V] and hence the output voltage of an AC rotating electric machine, as an electric power generator, is raised so that gasoline mileage is improved without utilizing any expensive high-voltage hybrid system. When the power-source voltage is the same as or higher than 60 [V], safety measures are required in order to reduce the danger against a human body; however, because in the foregoing technological trend, the voltage of the power source system of a vehicle is suppressed to be the same as or lower than 60 [V], the cost for the safety measures can be reduced.

For example, in the case of a permanent-magnet synchronous rotating electric machine whose rotor is provided with magnetic-field poles that are each formed of a permanent magnet, the value of the induction voltage induced across the armature coil increases as the rotation speed rises. Accordingly, in the case of an electric vehicle equipped with a permanent-magnet synchronous motor, as a driving source for the vehicle, there is provided a voltage suppression apparatus for suppressing a voltage to be applied to a switching device provided in an electric power converter from exceeding the withstanding voltage of the switching device. For example, the conventional motor control apparatus disclosed in Patent Document 1 is configured in the following manner: when due to an induction voltage in the motor, the voltage to be applied to the switching device becomes the same as or higher than a predetermined voltage, all the upper-arm switching devices for respective phases, in the inverter circuit as an electric power converter, which are connected with the high-voltage side of the DC power source are turned on or all the lower-arm switching devices for respective phases, in the inverter circuit, which are connected with the low-voltage side of the DC power source are turned on; thus, the motor is made to be in the three-phase short-circuiting state; as a result, an electric current is made to circulate between the motor and the inverter as the electric power converter so as to suppress the voltage applied to the switching devices.

PRIOR ART REFERENCE

Patent Document

Patent Document 1: Japanese Patent No. 5433608

DISCLOSURE OF THE INVENTION

Problems to be Solved by the Invention

As described above, in the conventional motor control apparatus, all the upper-arm switching devices or all the lower-arm switching devices for respective phases in the inverter circuit, as an electric power converter, are turned on so that the motor is made to be in the three-phase short-circuiting state; thus, an electric current is made to circulate between the motor and the inverter circuit so as to suppress the voltage applied to the switching devices. When the rotation speed of the motor decreases and hence the induction voltage becomes sufficiently lower than the withstanding voltage of the switching device, all the upper-arm and lower-arm switching devices in the inverter circuit are turned off so that the state of motor moves from the three-phase short-circuiting state to the all-phase opening state. In this situation, as represented in FIG. 1, because the power-source voltage for the inverter circuit may jump up and exceed the withstanding voltage of the switching device or 60 [V] for which safety measures are required.

That is to say, FIG. 1 is a graph representing voltage fluctuation and the like that are caused at a time when the state of the armature winding of an AC rotating electric machine is moved from the three-phase short-circuiting state to the all-phase opening state. The graph in FIG. 1 represents the case where the AC rotating electric machine is a three-phase electric rotating machine having a first group of armature windings including three-phase windings U, V, and W and a second group of armature windings including three-phase windings X, Y, and Z; there are represented the respective changes in the voltage and the current between an inverter and the three-phase electric rotating machine in the case where in a three-phase short-circuiting period T1, all the upper-arm switching devices for respective phases in the inverter circuit connected with the high-voltage side of a DC power source are turned on or all the lower-arm switching devices for respective phases in the inverter circuit connected with the low-voltage side of the DC power source are turned on so that the motor is made to be in the three-phase short-circuiting state and where in an all-phase opening period T2, all of the upper-arm and lower-arm switching devices in the inverter circuit are turned off so that the motor is made to be in the all-phase opening state.

As represented in FIG. 1, when the time period moves from the three-phase short-circuiting period T1 to the all-phase opening period T2, the DC-side terminal voltage of the inverter circuit connected with the DC power source of 36 [V] instantaneously increases by 13.5 [V] to jump up to a voltage as high as 49.5 [V], and the DC current that has been 0 [A] in the three-phase short-circuiting period T1 largely fluctuates as represented in FIG. 1, when the time period moves to the all-phase opening period T2. When the time period moves from the three-phase short-circuiting period T1 to the three-phase short-circuiting period T1, the three-phase current flowing between the inverter circuit and the rotating electric machine changes as represented in FIG. 1, and eventually, becomes 0 [A].

The reason why this phenomenon occurs is as follows: in the three-phase short-circuiting period T1, due to the three-phase current flowing in the armature winding, magnetic energy is accumulated; when the time period is changed from the three-phase short-circuiting period T1 to the all-phase opening period T2, the accumulated magnetic energy is discharged to the potential of the DC power source connected with the DC-side terminal of the inverter circuit, by way of a diode connected in parallel with the switching device of the inverter circuit; then, due to a wiring inductance between the inverter circuit and the DC power source, a smoothing capacitor inside the inverter circuit, and a capacitance component and a resistance component in the DC power source, an LCR resonance occurs.

As described above, in the conventional motor control apparatus, in the case where when the rotation speed of the motor decreases and hence the induction voltage becomes sufficiently lower than the withstanding voltage of the switching device, all of the upper-arm and lower-arm switching devices in the inverter circuit are turned off and hence the three-phase short-circuiting state is switched to the all-phase opening state, the voltage of the DC power source connected with the DC-side terminal of the inverter circuit jumps up, as described above, and may exceed the withstanding voltage of the switching device or 60 [V] for which safety measures are required.

The present invention has been implemented in order to solve the foregoing problems in the conventional system; the objective thereof is to provide a control apparatus that makes it possible that even when the state of an AC rotating electric machine is moved from an all-phase short-circuiting state such as the three-phase short-circuiting to the all-phase opening state, the voltage applied to the switching device in the electric power converter connected with the AC rotating electric machine is suppressed to a value that is the same as or lower than the withstanding voltage of the switching device.

Means for Solving the Problems

An AC-rotating-electric-machine control apparatus according to the present invention controls an AC rotating electric machine provided with two or more independent groups of multi-phase armature windings; the AC-rotating-electric-machine control apparatus includes two or more electric-power conversion circuits that control respective voltages to be applied to the two or more groups of multi-phase armature windings, for each of the two or more groups of multi-phase armature windings, and is characterized in that each of the two or more electric-power conversion circuits has two or more switching devices for opening or closing the corresponding group of multi-phase armature windings, for each of the phases, and in that the two or more switching devices are switching-controlled in such a way as to be able to apply opening operation or duty control to the corresponding group of multi-phase armature windings.

Advantage of the Invention

An AC-rotating-electric-machine control apparatus according to the present invention includes two or more electric-power conversion circuits that control respective voltages to be applied to the two or more groups of multi-phase armature windings, for each of the two or more groups of multi-phase armature windings; each of the two or more electric-power conversion circuits has two or more switching devices for opening or closing the corresponding group of multi-phase armature windings, for each of the phases; the two or more switching devices are switching-controlled in such a way as to be able to apply opening operation or duty control to the corresponding group of multi-phase armature windings. As a result, it is made possible that even when the state of an AC rotating electric machine is moved from an all-phase short-circuiting state such as the three-phase short-circuiting to the all-phase opening state, the voltage applied to the switching device in the electric power converter connected with the AC rotating electric machine is suppressed to a value that is the same as or lower than the withstanding voltage of the switching device.

BRIEF DESCRIPTION OF THE DRAWINGS

FIG. 8 is a flowchart for explaining the operation of changing the target torque at a time of transition from the three-phase short-circuiting state to the duty-output state in the AC-rotating-electric-machine control apparatus according to Embodiment 4 of the present invention.

BEST MODE FOR CARRYING OUT THE INVENTION

Figure 1:
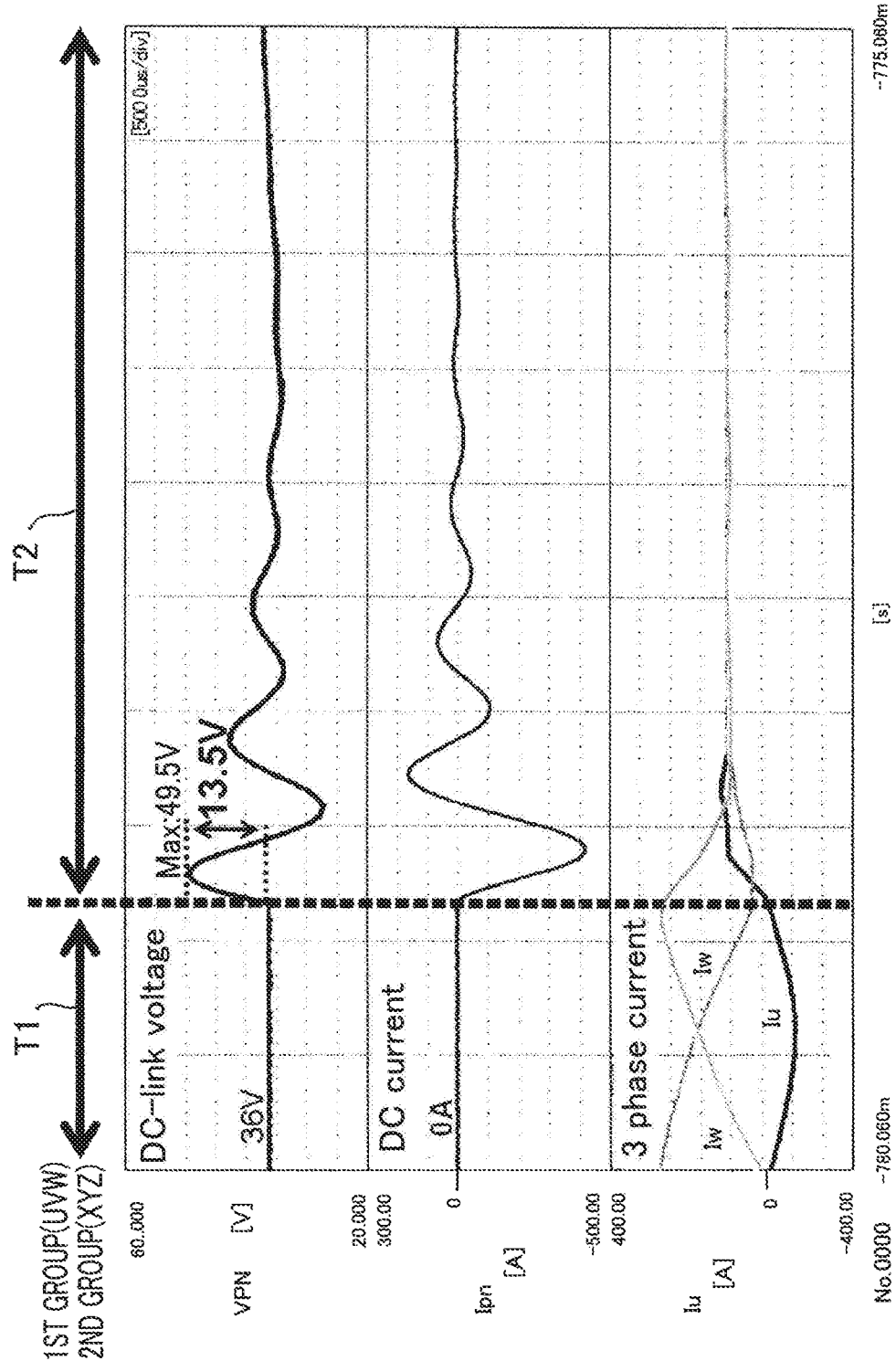
FIG. 1 is a graph representing voltage fluctuation and the like that are caused at a time when the state of the armature winding of a rotating electric machine is moved from the three-phase short-circuiting state to the all-phase opening state.

Hereinafter, preferred embodiments of an AC-rotating-electric-machine control apparatus according to the present invention will be explained by use of the drawings. In each of the drawings, the same or similar constituent elements are designated by the same reference characters.

Embodiment 1

Figure 2:
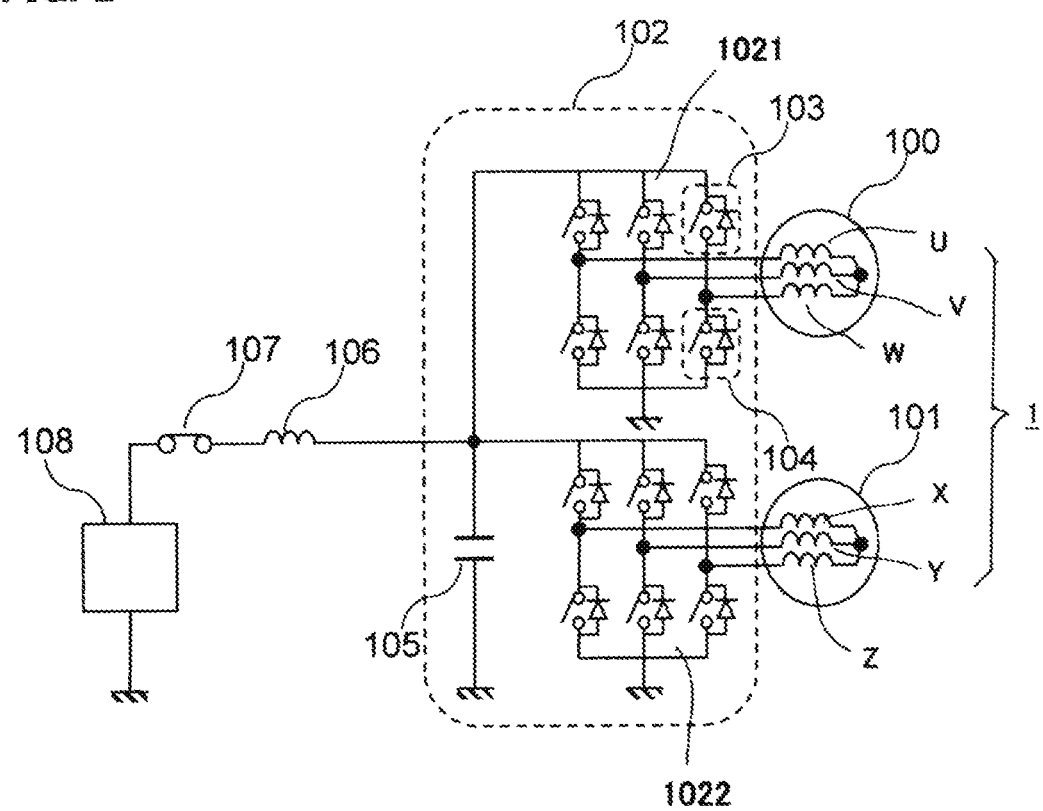
FIG. 2 is a schematic configuration diagram representing an AC-rotating-electric-machine control apparatus according to Embodiment 1 of the present invention.

FIG. 2 is a schematic configuration diagram representing an AC-rotating-electric-machine control apparatus according to Embodiment 1 of the present invention. In FIG. 2, an AC rotating electric machine 1 is formed as a double-three-phase motor in which two groups of armature windings, i.e., a first group of armature windings 100 including three-phase windings U, V, and W and a second group of armature windings 101 including three-phase windings X, Y, and Z are provided in a single motor. In Embodiment 1, the AC rotating electric machine 1 will be referred to as a double-three-phase motor. Because this double-three-phase motor 1 separately controls the first group of armature windings 100 and the second group of armature windings 101, it is made possible to perform separate torque control.

A double-three-phase electric power converter 102 is provided with a first electric-power conversion circuit 1021 and a second electric-power conversion circuit 1022. The first electric-power conversion circuit 1021 has three-phase arms, each of which includes an upper-arm switching device 103 and a lower-arm switching device 104 that are connected in series with each other; respective three-phase AC-side terminals pulled out from these three-phase arms are connected with three-phase windings U, V, and W of the first group of armature windings 100; one of the DC-side terminals is connected with the ground potential portion, and the other one of the DC-side terminals is connected with the positive electrode terminal of a DC power source apparatus whose output voltage is, for example, 48 [V] (hereinafter, referred to only as a DC power source apparatus) 108 by way of a line impedance 106 and a contactor 107. Each of the upper-arm switching device 103 and the lower-arm switching device 104 is formed of a semiconductor switching device and a diode that are connected in parallel with each other in a package.

The second electric-power conversion circuit 1022 in the double-three-phase electric power converter 102 has three-phase arms, each of which is formed as is the case with the first electric-power conversion circuit 1021; respective three-phase AC-side terminals pulled out from these three-phase arms are connected with three-phase windings X, Y, and Z of the second group of armature windings 101; one of the DC-side terminals is connected with the ground potential portion, and the other one of the DC-side terminals of the second electric-power conversion circuit 1022 and the other one of the DC-side terminals of the first electric-power conversion circuit 1021 are commonly connected with the positive electrode terminal of the DC power source apparatus 108 by way of the line impedance 106 and the contactor 107. A smoothing capacitor 105 is connected between the ground potential portion and the commonly connected DC-side terminals of the first electric-power conversion circuit 1021 and the second electric-power conversion circuit 1022.

The smoothing capacitor 105 is provided for absorbing a surge voltage caused at a time when the upper-arm switching device 103 and the lower-arm switching device 104 are on/off-switched and for smoothing a regenerative voltage to the DC power source apparatus 108, caused by regenerative operation of the double-three-phase motor 1. The contactor 107 is a switch for performing cutting-off and conduction of electric-power transfer between the DC power source apparatus 108 of an output voltage 48 [V] and the double-three-phase electric power converter 102. The DC power source apparatus 108 supplies DC electric power to the double-three-phase electric power converter 102 or is charged with DC electric power from the double-three-phase electric power converter 102.

The double-three-phase electric power converter 102 formed of the first electric-power conversion circuit 1021 and the second electric-power conversion circuit 1022 has six sets of arms, each of which includes the upper-arm switching device 103 and the lower-arm switching device 104; by turning on or off the switching devices, the double-three-phase electric power converter 102 converts DC electric power obtained from the DC power source apparatus 108 into AC electric power and then supplies the AC electric power to the double-three-phase motor 1; alternatively, the double-three-phase electric power converter 102 converts AC electric power generated by the double-three-phase motor 1 into DC electric power and then supplies the DC electric power to the DC power source apparatus 108.

Figure 3:
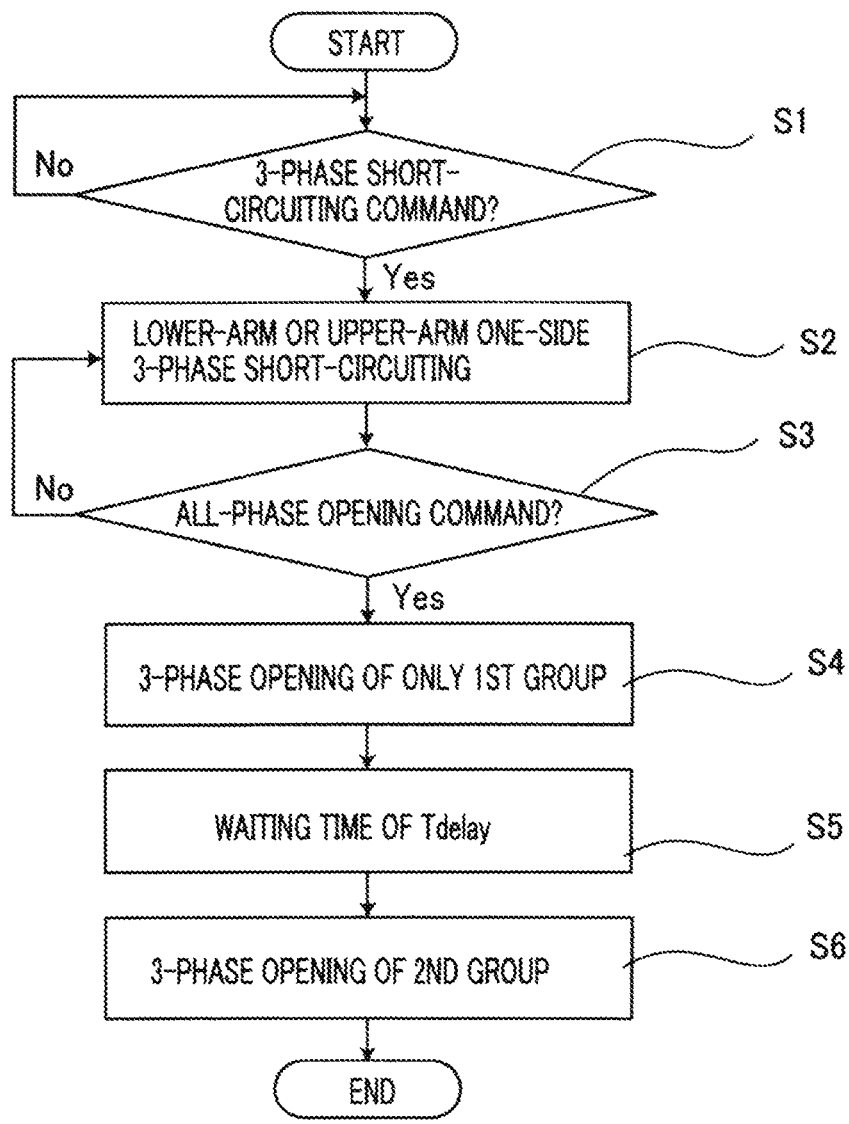
FIG. 3 is a flowchart for explaining the operation of the AC-rotating-electric-machine control apparatus according to Embodiment 1 of the present invention at a time of transition from the three-phase short-circuiting state to the all-phase opening state.

Next, there will be explained the operation of the AC-motor control apparatus, according to Embodiment 1 of the present invention, that is configured as described above. FIG. 3 is a flowchart for explaining the operation of the AC-rotating-electric-machine control apparatus according to Embodiment 1 of the present invention at a time of transition from the three-phase short-circuiting state to the all-phase opening state. Based on FIGS. 2 and 3, the operation of the AC-motor control apparatus will be explained. In FIG. 2, when all the respective upper-arm switching devices 103 and the respective lower-arm switching devices 104 in the first electric-power conversion circuit 1021 and the second electric-power conversion circuit 1022 of the double-three-phase electric power converter 102 are opened so that the rotor of the double-three-phase motor 1, which is an permanent-magnet synchronous rotating electric machine, is rotated, an induction voltage, expressed by the following equation, occurs across each of the first group of armature windings 100 and the second group of armature windings 101. The induction voltage rises in proportion to the rotation speed of the double-three-phase motor 1; when the induction voltage exceeds the power-source voltage of the DC power source apparatus 108, a motor current flows through the respective diodes connected in parallel with the upper-arm switching device 103 and the lower-arm switching device 104.

$$V_{Ind} = \omega \times \Phi a$$

where $V_{ind}$, $\omega$, and $\Phi a$ are the induction voltage [V], the electric angular frequency [rad/s], and the interlinked magnetic flux [Wb], respectively.

When the motor current flows, a negative power-source current flows in the DC power source apparatus 108 and hence driving torque produced by the double-three-phase motor 1 becomes negative torque. In order to prevent this phenomenon, a controller unit (unillustrated) outputs to the double-three-phase electric power converter 102 a three-phase short-circuiting command for bringing the double-three-phase motor 1 into the three-phase short-circuiting state. In the step S1 in FIG. 3, it is determined whether or not the three-phase short-circuiting command exists; in the case where the three-phase short-circuiting command exists (Yes), the step S1 is followed by the step S2. In the step S2, in the double-three-phase electric power converter 102, the respective upper-arm switching devices 103 or the respective lower-arm switching devices 104 in both the first electric-power conversion circuit 1021 and the second electric-power conversion circuit 1022 are turned on so that the double-three-phase motor 1 is brought into the three-phase short-circuiting state. As a result, the respective induction voltages generated across the first group of armature windings 100 and the second group of armature windings 101 are consumed in the double-three-phase motor 1, so that the voltage applied to the double-three-phase electric power converter 102 can be decreased.

In this situation, when the rotation speed of the double-three-phase motor 1, which is a permanent magnet synchronous motor, decreases and hence the anticipated induction voltage becomes sufficiently lower than the power-source voltage of the DC power source apparatus 108, the controller unit, firstly, outputs an all-phase opening command to the first electric-power conversion circuit 1021 of the double-three-phase electric power converter 102 in order to reduce the negative driving torque produced in the double-three-phase motor 1. In the step S3 in FIG. 3, it is determined whether or not the all-phase opening command exists; in the case where the all-phase opening command exists (Yes), the step S3 is followed by the step S4. In the step S4, in the first electric-power conversion circuit 1021, the respective upper-arm switching devices 103 or the respective lower-arm switching devices 104, which have been in the ON state, are turned off so that the switching devices in the first electric-power conversion circuit 1021 are brought into the three-phase opening state, i.e., the all-phase opening state.

When all the switching devices in the first electric-power conversion circuit 1021 are opened, the current flowing in the first group of armature windings 100 of the double-three-phase motor 1 changes from the current that has been flowing while the first electric-power conversion circuit 1021 was in the three-phase short-circuiting state to "0". The magnetic energy expressed by the following equation based on the amount of the current change raises the power-source voltage of the DC power source apparatus 108.

$$W_{coil} = \frac{1}{2} \times L \times I^2$$

where $W_{coil}$, L, I are the magnetic energy [W], the inductance [H] of the first group of armature windings 100, and the motor current [Arms] in the first electric-power conversion circuit 1021 at a time of the three-phase short-circuiting state, respectively.

The magnetic energy expressed by the above equation causes LCR resonance based on the inductance component, the capacitance component, and the resistance component between the double-three-phase electric power converter 102 and the DC power source apparatus 108 The half of the LCR resonance period can be calculated by the following equation.

$$\frac{1}{2} \times T_o = \frac{1}{2 \times f_o} = \pi \times \sqrt{L \times C} \qquad (1)$$

where To, fo, L, and C are the LCR resonance period [sec], the LCR resonance frequency [Hz], the inductance component [H] between the double-three-phase electric power converter 102 and the DC power source apparatus 108, and the capacitance component [F] between the double-three-phase electric power converter 102 and the DC power source apparatus 108, respectively.

Next, in the step S5, the foregoing controller unit outputs the all-phase opening command to the first electric-power conversion circuit 1021, and then, the controller unit outputs the all-phase opening command, which is delayed from the foregoing all-phase opening command by the half period of the LCR resonance frequency calculated through the equation (3), to the second electric-power conversion circuit 1022. In the step S6, in the second electric-power conversion circuit 1022 that receives the all-phase opening command, the respective upper-arm switching devices 103 or the respective lower-arm switching devices 104, which have been in the ON state, are turned off so that the switching devices in the second electric-power conversion circuit 1022 are brought into the three-phase opening state, i.e., the all-phase opening state. As a result, the respective phases of the pulsation frequencies, of the power-source voltage, that are caused by the induction voltages generated across the first group of armature windings 100 and the second group of armature windings 101 are reverse to each other, so that the amplitude of the fluctuation in the power-source voltage can be reduced.

Figure 4:
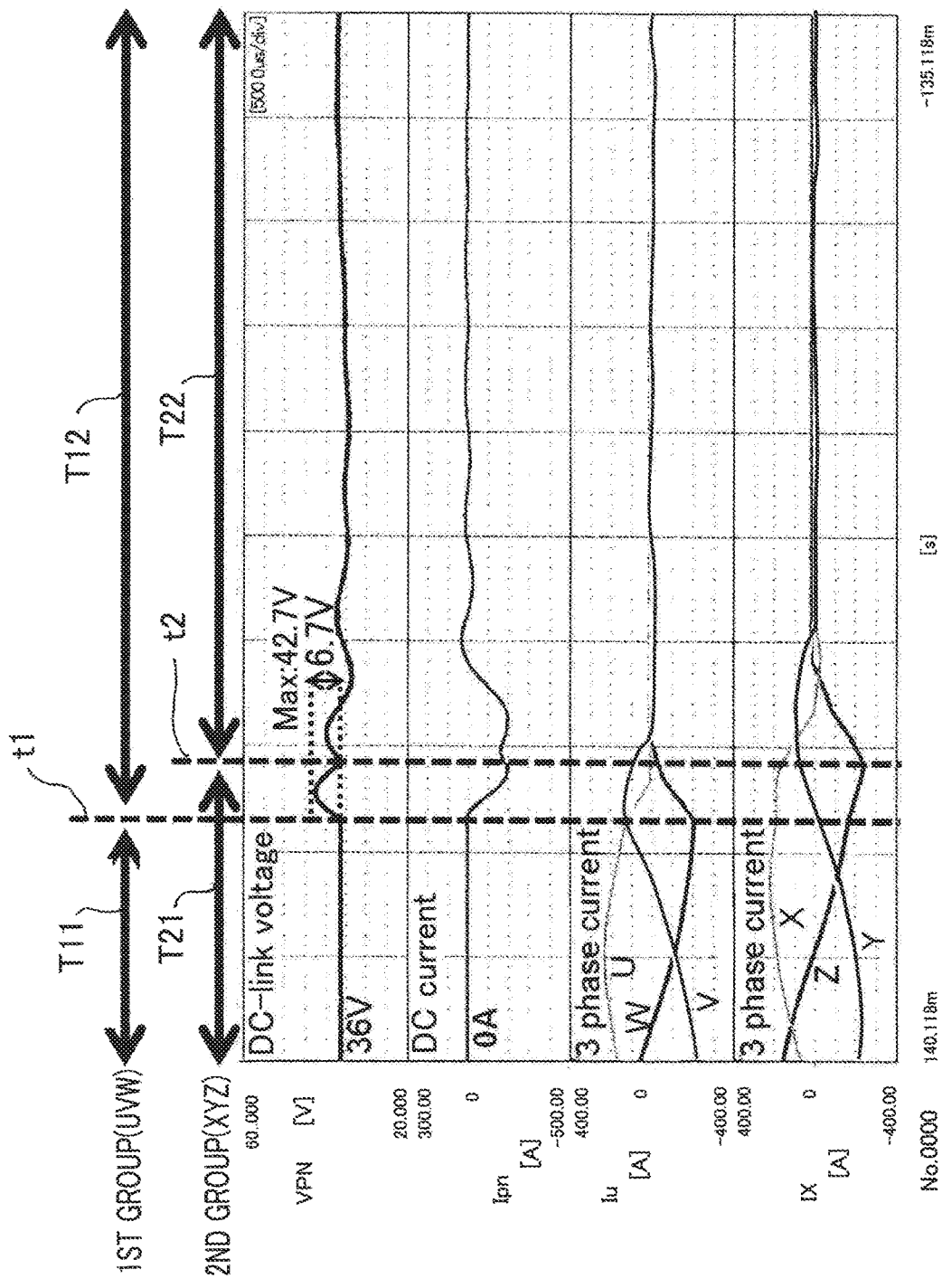
FIG. 4 is a graph representing voltage fluctuation and the like in the AC-rotating-electric-machine control apparatus according to Embodiment 1 of the present invention at a time of transition from the three-phase short-circuiting state to the all-phase opening state.

FIG. 4 is a graph representing voltage fluctuation and the like in the AC-rotating-electric-machine control apparatus according to Embodiment 1 of the present invention at a time of transition from the three-phase short-circuiting state to the all-phase opening state. As represented in FIG. 4, at the time point t1, the period for the first group of armature windings 100 is changed from a three-phase short-circuiting period T11 to an all-phase opening period T12; then, at the time point t2, which is delayed from the time point t1 by the half period of the LCR resonance frequency calculated through the foregoing equation, the period for the second group of armature windings 101 is changed from a three-phase short-circuiting period T21 to an all-phase opening period T22; as a result, the power-source voltage of the DC power source apparatus 108 rises by 6.7V [V] from 36 [V] so as to become as high as 42.7 [V] and hence the voltage fluctuation can be suppressed to the half of the voltage change in the conventional case represented in FIG. 1.

Embodiment 2

Figure 5:
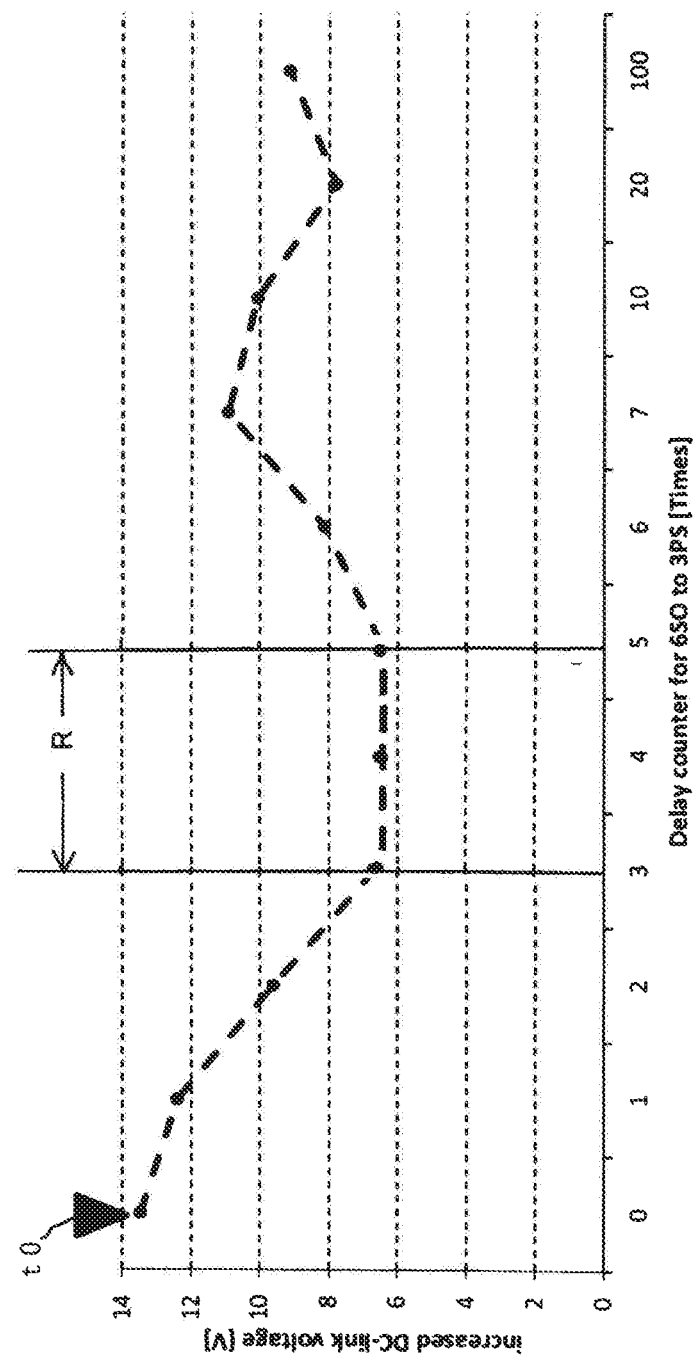
FIG. 5 is a graph representing voltage fluctuation and the like, in the AC-rotating-electric-machine control apparatus according to Embodiment 2 of the present invention, that are caused at a time when the switching period of transition from the three-phase short-circuiting state to the all-phase opening state is changed to a multiple of the carrier period.

Next, an AC-rotating-electric-machine control apparatus according to Embodiment 2 of the present invention will be explained. The configuration of the AC-rotating-electric-machine control apparatus according to Embodiment 2 of the present invention is the same as the configuration of foregoing Embodiment 1 in FIG. 2. FIG. 5 is a graph representing voltage fluctuation and the like, in the AC-rotating-electric-machine control apparatus according to Embodiment 2 of the present invention, that are caused at a time when the switching period of transition from the three-phase short-circuiting state to the all-phase opening state is changed to a multiple of the carrier period. As represented in FIG. 5, in the case where the double-three-phase electric power converter 102 adopts a PWM control method, there exists a region R in which the reduction effect on the power-source voltage does not change even when the timing of switching the period from the three-phase short-circuiting period to the all-phase opening period is changed in accordance with the carrier period corresponding to the pulse spacing.

Accordingly, in the AC-rotating-electric-machine control apparatus according to Embodiment 2 of the present invention, because in the foregoing region R, it is not required to change the respective switching timings for switching the respective states of the first group of armature windings 100 and the second group of armature windings 101 from the three-phase short-circuiting state to all-phase opening state accurately in accordance with the half of the LCR resonance period, the time of the switching-timing difference between the first group of armature windings 100 and the second group of armature windings 101 is set to a multiple of the carrier period, as represented in the following equation.

$$T_{Delaycounter} = \frac{T_O}{2 \times Tcc} = \frac{\pi \times \sqrt{L \times C}}{Tcc} \quad (2)$$

$T_{Delaycounter}$: The half of the LCR resonance period is set to a multiple of the carrier period (an integer nearest to the calculation result).

$Tcc$: Carrier Frequency [sec] (3)

$T_{delay} = T_{Delaycounter} \times Tcc$ (4)

$T_{delay}$: The time of difference between the respective switching timings of 1st group of armature windings and 2nd group of armature windings [sec] (5)

As a result, because driving can be performed in a normal control period, without providing any extra interrupt processing for the switching timing, the processing load can be reduced.

The time of switching-timing difference between the first group of armature windings 100 and the second group of armature windings 101 may be set to a multiple of the carrier period, as in the case of Embodiment 3, described later.

Embodiment 3

Next, an AC-rotating-electric-machine control apparatus according to Embodiment 3 of the present invention will be explained. The configuration of the AC-rotating-electric-machine control apparatus according to Embodiment 3 of the present invention is the same as the configuration of foregoing Embodiment 1 in FIG. 2. In foregoing Embodiment 1, the control is performed in such a way that the state of each of the groups of multi-phase armature windings is switched from the three-phase short-circuiting state to all-phase opening state, and the respective switching timings for the groups are shifted by the half of the LCR resonance period based on the inductance component, the capacitance component, and the resistance component included between the electric-power conversion circuit and the power source connected with the electric-power conversion circuit; however, in the AC-rotating-electric-machine control apparatus according to Embodiment 3 of the present invention, the control is performed in such away that the state of each of the groups of multi-phase armature windings is switched from the three-phase short-circuiting state to the duty control state, and the respective switching timings for the groups are shifted by the half of the LCR resonance period based on the inductance component, the capacitance component, and the resistance component included between the electric-power conversion circuit and the power source connected with the electric-power conversion circuit.

Figure 6:
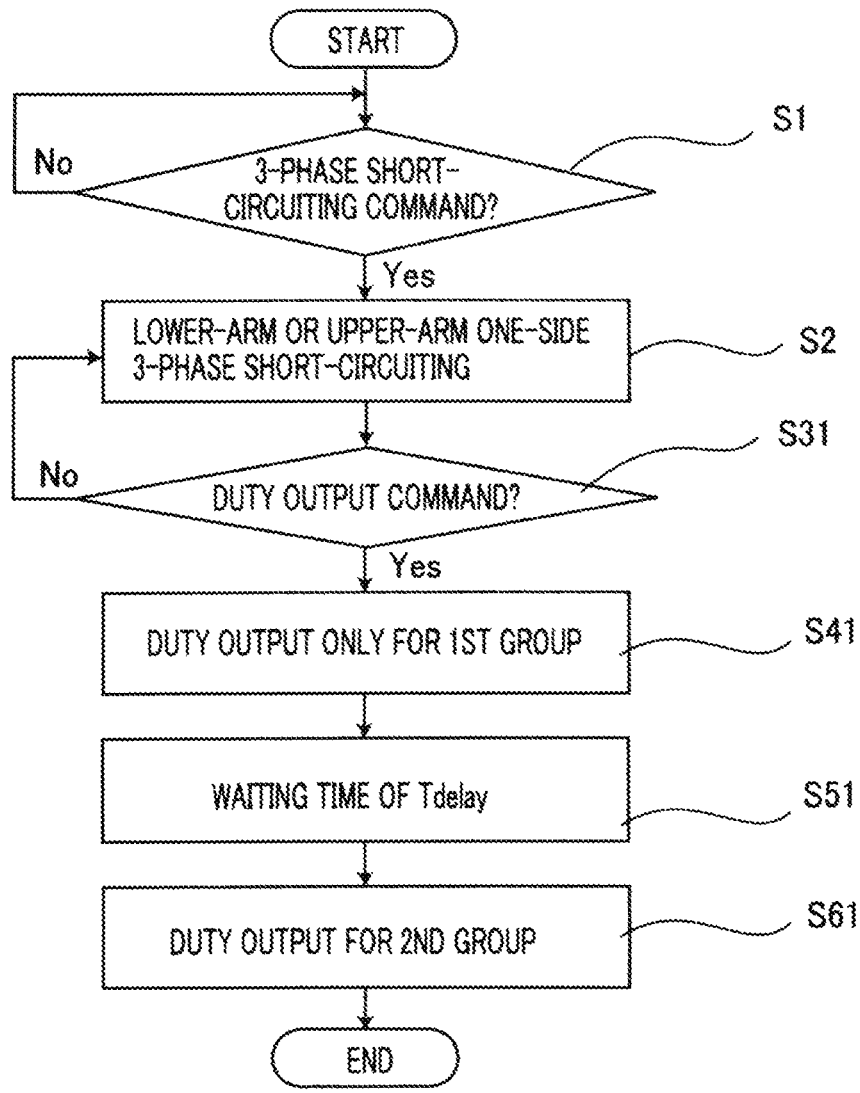
FIG. 6 is a flowchart for explaining the operation of changing the switching timing of transition from the three-phase short-circuiting state to the duty-output state in an AC-rotating-electric-machine control apparatus according to Embodiment 3 of the present invention.

FIG. 6 is a flowchart for explaining the operation of changing the switching timings at a time of transition from the three-phase short-circuiting state to the duty-output state in the AC-rotating-electric-machine control apparatus according to Embodiment 3 of the present invention. Based on FIGS. 2 and 6, the operation of changing the switching timings will be explained. In FIG. 2, when all the respective upper-arm switching devices 103 and the respective lower-arm switching devices 104 in the first electric-power conversion circuit 1021 and the second electric-power conversion circuit 1022 of the double-three-phase electric power converter 102 are opened so that the rotor of the double-three-phase motor 1, which is an permanent-magnet synchronous rotating electric machine, is rotated, an induction voltage, expressed by the following equation, occurs across each of the first group of armature windings 100 and the second group of armature windings 101. The induction voltage rises in proportion to the rotation speed of the double-three-phase motor 1; when the induction voltage exceeds the power-source voltage of the DC power source apparatus 108, a motor current flows through the respective diodes connected in parallel with the upper-arm switching device 103 and the lower-arm switching device 104.

$$V_{Ind} = \omega \times \Phi a$$

where $V_{ind}$, $\omega$, and $\Phi a$ are the induction voltage [V], the electric angular frequency [rad/s], and the interlinked magnetic flux [Wb], respectively.

When the motor current flows, a negative power-source current flows in the DC power source apparatus 108 and hence driving torque produced by the double-three-phase motor 1 becomes negative torque. In order to prevent this phenomenon, a controller unit (unillustrated) outputs to the double-three-phase electric power converter 102 a three-phase short-circuiting command for bringing the double-three-phase motor 1 into the three-phase short-circuiting state. In the step S1 in FIG. 6, it is determined whether or not the three-phase short-circuiting command exists; in the case where the three-phase short-circuiting command exists (Yes), the step S1 is followed by the step S2. In the step S2, in the double-three-phase electric power converter 102, the respective upper-arm switching devices 103 or the respective lower-arm switching devices 104 in both the first electric-power conversion circuit 1021 and the second electric-power conversion circuit 1022 are turned on so that the double-three-phase motor 1 is brought into the three-phase short-circuiting state. As a result, the respective induction voltages generated across the first group of armature windings 100 and the second group of armature windings 101 are consumed in the double-three-phase motor 1, so that the voltage applied to the double-three-phase electric power converter 102 can be decreased.

In this situation, when the rotation speed of the double-three-phase motor 1, which is a permanent magnet synchronous motor, decreases and hence the anticipated induction voltage becomes sufficiently lower than the power-source voltage of the DC power source apparatus 108, the controller unit, firstly, outputs a duty control command to the first electric-power conversion circuit 1021 of the double-three-phase electric power converter 102 in order to reduce the negative driving torque produced in the double-three-phase motor 1. In the step S31 in FIG. 6, it is determined whether or not the all-phase opening command exists; in the case where the all-phase opening command exists (Yes), the step S31 is followed by the step S41. In the step S41, the state of the first electric-power conversion circuit 1021 is moved from the present all-phase short-circuiting state to the duty control state.

Because the first electric-power conversion circuit 1021 is brought into the duty control state, the current flowing in the first group of armature windings 100 of the double-three-phase motor 1 decreases.

Next, in the step S51, the foregoing controller unit outputs the all-phase opening command to the first electric-power conversion circuit 1021, and then, the controller unit outputs the all-phase opening command, which is delayed from the foregoing all-phase opening command by the half of the LCR resonance period expressed by the following equation, to the second electric-power conversion circuit 1022.

$$\frac{1}{2} \times T_o = \frac{1}{2 \times f_o} = \pi \times \sqrt{L \times C} \qquad (6)$$

where To, fo, L, and C are the LCR resonance period [sec], the LCR resonance frequency [Hz], the inductance component [H] between the double-three-phase electric power converter 102 and the DC power source apparatus 108, and the capacitance component [F] between the double-three-phase electric power converter 102 and the DC power source apparatus 108, respectively.

In the step S61, the state of the second electric-power conversion circuit 1022 that receives the duty control command is moved from the present all-phase short-circuiting state to the duty control state. As a result, the respective phases of the pulsation frequencies, of the power-source voltage, that are caused by the induction voltages generated across the first group of armature windings 100 and the second group of armature windings 101 are reverse to each other, so that the amplitude of the fluctuation in the power-source voltage can be reduced.

As is the case with Embodiment 1, in the AC-rotating-electric-machine control apparatus according to Embodiment 3, the respective phases of the pulsation frequencies, of the power-source voltage, that are caused by the induction voltages generated across the first group of armature windings 100 and the second group of armature windings 101 are reverse to each other, so that the amplitude of the fluctuation in the power-source voltage can be reduced.

Embodiment 4

Figure 7:
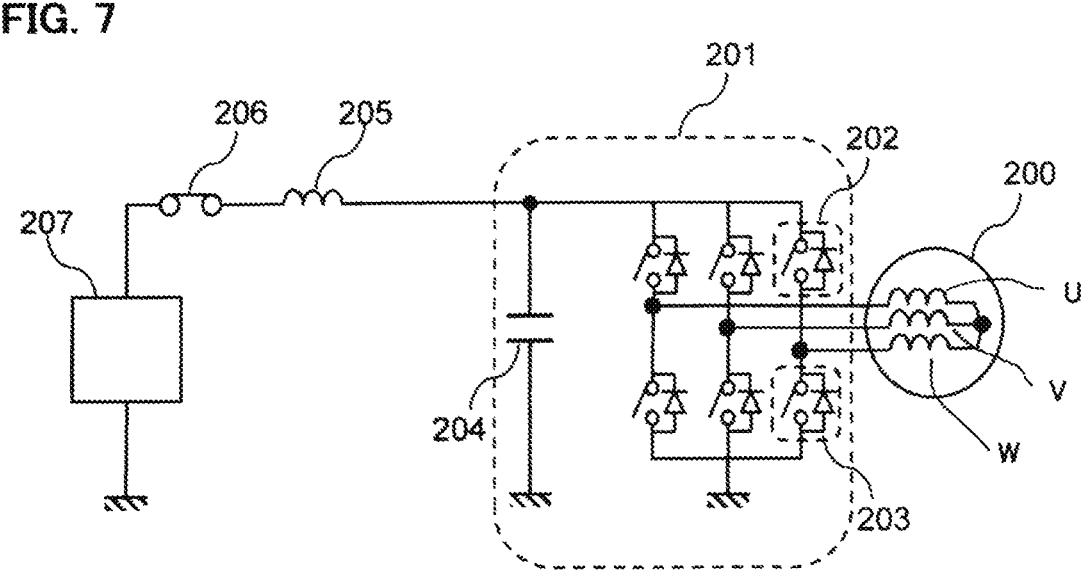
FIG. 7 is a schematic configuration diagram representing an AC-rotating-electric-machine control apparatus according to Embodiment 4 of the present invention.

Next, an AC-rotating-electric-machine control apparatus according to Embodiment 4 of the present invention will be explained. FIG. 7 is a schematic configuration diagram representing an AC-rotating-electric-machine control apparatus according to Embodiment 4 of the present invention. FIG. 8 is a flowchart for explaining the operation of changing the target torque at a time of transition from the three-phase short-circuiting state to the duty-output state in the AC-rotating-electric-machine control apparatus according to Embodiment 4 of the present invention.

In FIG. 7, a permanent magnet synchronous motor 200 as the AC rotating electric machine is controlled by an electric-power conversion circuit 201 that operates, for example, as an inverter. The electric-power conversion circuit 201 is provided with an upper-arm switching device 202 and a lower-arm switching device 203 for each of three phases. The electric-power conversion circuit 201 is an apparatus that converts DC electric power obtained from the DC power source apparatus 207 whose output voltage is 48 [V] into AC electric power, by turning on or off the switching devices, and that converts AC electric power obtained from the permanent magnet synchronous motor 200 into DC electric power.

The smoothing capacitor 204 is provided for absorbing a surge voltage caused at a time when the upper-arm switching device 202 and the lower-arm switching device 203 are on/off-switched and for smoothing the power-source voltage during power-running regeneration. A contactor 206 is a switch that performs switching between cutting-off and conduction of electric-power transfer between the DC power source apparatus 207 and the electric-power conversion circuit 201. The DC power source apparatus 207 is a power source apparatus that performs DC-electric-power transfer with the double electric-power conversion circuit 201.

Next, the operation will be explained. In FIGS. 7 and 8, when the respective upper-arm switching devices 202 and the respective lower-arm switching devices 203 for all the phases in the electric-power conversion circuit 201 are opened so that the permanent-magnet synchronous motor is rotated, an induction voltage, expressed by the following equation, occurs across the armature windings. This induction voltage rises in proportion to the rotation speed; when the induction voltage exceeds the power-source voltage, the motor current flows through respective diodes in the switching devices.

$$V_{Ind} = \omega \times \Phi a$$

where $V_{Ind}$, $\omega$, and $\Phi a$ are the induction voltage [V], the electric angular frequency [rad/s], and the interlinked magnetic flux [Wb], respectively.

When the motor current flows, a negative power-source current flows in the DC power source apparatus 207 and hence driving torque becomes negative torque. In order to prevent this phenomenon, a controller unit (unillustrated) outputs to the electric-power conversion circuit 201 a three-phase short-circuiting command for bringing the permanent-magnet synchronous motor into the three-phase short-circuiting state. In the step S1, it is determined whether or not the three-phase short-circuiting command exists; in the case where the three-phase short-circuiting command exists (Yes), the step S1 is followed by the step S2, where the electric-power conversion circuit 201 receives the three-phase short-circuiting command and then turns on the respective upper-arm switching devices 202 or the respective lower-arm switching devices 203 so as to bring the permanent-magnet synchronous motor into the three-phase short-circuiting state. As a result, the produced induction voltage is consumed in the permanent-magnet synchronous motor, so that the voltage applied to the inverter can be reduced.

In this situation, in the case where the permanent magnet synchronous motor 200 is driven, the controller unit outputs a command for switching the three-phase short-circuiting state into the duty-output control state. In the step S31, it is determined whether or not a duty-output control command exists; in the case where the duty-output control command exists (Yes), the step S31 is followed by the step S7, where the motor current flowing in the three-phase short-circuiting state is measured. Next, in the step S8, the target torque of the permanent magnet synchronous motor 200 is changed so that the motor current value becomes the same as the motor current value measured in the step S7; then, in the step S9, the voltage with a duty ratio corresponding to the target torque is outputted.

Even in the case where the target current is changed instead of changing the target torque so that a motor current the same as the motor current that has been flowing at a time of the three-phase short-circuiting state flows, the same effect is demonstrated.

After that, in the step S10, by means of the characteristics of a linear lowpass filter, the permanent magnet synchronous motor 200 is eventually made to keep track of the command torque. Accordingly, the change in the motor current can be controlled by a lowpass filter and hence the changing value of the power-source voltage can also be controlled.

The foregoing embodiments have been explained with a permanent-magnet synchronous motor, as an example; however, the same effect is demonstrated also with any other motor such as a field winding motor, an induction motor, a reluctance motor, or the like. Moreover, the foregoing embodiments have been explained with a double-three-phase AC rotating electric machine and an inverter system, as examples; however, even a system provided with two or more respective motors and electric-power conversion circuits demonstrates the same effect. Furthermore, the DC power source apparatus is not limited to a power source system of 48 [V]; a power source system of any voltage demonstrates the same effect.

In the scope of the present invention, the embodiments thereof can appropriately be combined, modified, or omitted.

Each of the foregoing AC-rotating-electric-machine control apparatuses according to respective Embodiments of the present invention is the one in which at least any one of the following inventions is put into practice.

(1) An AC-rotating-electric-machine control apparatus that controls an AC rotating electric machine provided with two or more independent groups of multi-phase armature windings, the AC-rotating-electric-machine control apparatus including two or more electric-power conversion circuits that control respective voltages to be applied to the two or more groups of multi-phase armature windings, for each of the two or more groups of multi-phase armature windings, wherein each of the two or more electric-power conversion circuits has two or more switching devices for opening or closing the corresponding group of multi-phase armature windings, for each of the phases, and wherein the two or more switching devices are switching-controlled in such a way as to be able to apply opening operation or duty control to the corresponding group of multi-phase armature windings.

This invention makes it possible that even when the state of an AC rotating electric machine is moved from an all-phase short-circuiting state such as the three-phase short-circuiting to the all-phase opening state, the voltage applied to the switching device in the electric power converter connected with the AC rotating electric machine is suppressed to a value that is the same as or lower than the withstanding voltage of the switching device.

(2) The AC-rotating-electric-machine control apparatus according to (1), wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings, wherein each of the two or more groups of multi-phase armature windings is brought into an all-phase short-circuiting state when all the upper-arm switching devices or all the lower-arm switching devices in the corresponding electric-power conversion circuit are closed and is brought into an all-phase opening state when all the upper-arm switching devices or all the lower-arm switching devices in the corresponding electric-power conversion circuit are opened, and wherein the two or more electric-power conversion circuits control respective switching timings for switching the state of the multi-phase armature windings from the all-phase short-circuiting state to the all-phase opening state in such a way that the respective switching timings differ depending on the two or more groups of multi-phase armature windings.

This invention makes it possible that even when the state of an AC rotating electric machine is moved from an all-phase short-circuiting state such as the three-phase short-circuiting to the all-phase opening state, fluctuation of the power-source voltage can be suppressed and hence the voltage applied to the switching device in the electric power converter connected with the AC rotating electric machine is suppressed to a value that is the same as or lower than the withstanding voltage of the switching device.

(3) The AC-rotating-electric-machine control apparatus according to (1), wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings, wherein each of the two or more groups of multi-phase armature windings is brought into an all-phase short-circuiting state when all the upper-arm switching devices or all the lower-arm switching devices in the corresponding electric-power conversion circuit are closed, and wherein the two or more electric-power conversion circuits control respective switching timings for switching the state of the multi-phase armature windings from the all-phase short-circuiting state to the duty control state in such a way that the respective switching timings differ depending on the two or more groups of multi-phase armature windings.

This invention makes it possible that even when the state of an AC rotating electric machine is moved from an all-phase short-circuiting state such as the three-phase short-circuiting to the all-phase opening state, fluctuation of the power-source voltage can be suppressed and hence the voltage applied to the switching device in the electric power converter connected with the AC rotating electric machine is suppressed to a value that is the same as or lower than the withstanding voltage of the switching device.

(4) The AC-rotating-electric-machine control apparatus according to any one of (2) and (3), wherein the switching timings are controlled in such a way that respective voltage fluctuation components in one group and in the other group, caused by the switching, are reverse to each other.

This invention makes the respective phases of the pulsation frequencies of the power-source voltage reverse to each other, so that the amplitude of the fluctuation in the power-source voltage can be reduced; thus, it is made possible to perform the control in such a way that the voltage to be applied to the switching device can be suppressed to a value that is the same as or lower than the withstanding voltage of the switching device.

(5) The AC-rotating-electric-machine control apparatus according to any one of (2) through (4), wherein the respective switching timings that are controlled in such a way as to differ depending on the groups of multi-phase armature windings are respective switching timings that are shifted for each of the groups by the half of an LCR resonance period based on an inductance component, a capacitance component, and a resistance component included between the electric-power conversion circuit and a power source connected with the electric-power conversion circuit.

This invention makes it possible to reduce the amplitude of the fluctuation in the power-source voltage; thus, it is made possible to perform the control in such a way that the voltage to be applied to the switching device can be suppressed to a value that is the same as or lower than the withstanding voltage of the switching device.

(6) The AC-rotating-electric-machine control apparatus according to any one of (2) through (4), wherein each of the two or more electric-power conversion circuits performs PWM-control of the switching device, and wherein the switching timings that are controlled in such a way as to differ depending on the groups of multi-phase armature windings are switching timings that each are controlled in such a way as to become a multiple of a carrier period.

This invention makes it possible to reduce the amplitude of the fluctuation in the power-source voltage; thus, it is made possible to perform the control in such a way that the voltage to be applied to the switching device can be suppressed to a value that is the same as or lower than the withstanding voltage of the switching device.

(7) The AC-rotating-electric-machine control apparatus according to (1), wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings, wherein each of the two or more groups of multi-phase armature windings is brought into an all-phase short-circuiting state when all the upper-arm switching devices or all the lower-arm switching devices in the corresponding electric-power conversion circuit are closed, wherein each of the two or more electric-power conversion circuits switches the state of the multi-phase armature windings from the all-phase short-circuiting state to the duty control state, and wherein when the state of the multi-phase armature windings is switched from the all-phase short-circuiting state to the duty control state, a target torque of the AC rotating electric machine is changed in accordance with the value of a motor current that flows in the all-phase short-circuiting state.

This invention makes it possible to reduce the amplitude of the fluctuation in the power-source voltage; thus, it is made possible to perform the control in such a way that the voltage to be applied to the switching device can be suppressed to a value that is the same as or lower than the withstanding voltage of the switching device.

(7) The AC-rotating-electric-machine control apparatus according to (7), wherein the target torque is changed in such a way that the motor current value becomes the same as the value of the motor current that flows in the all-phase short-circuiting state, and wherein the changed target torque is controlled in such a way as to keep track of command torque.

This invention makes it possible to reduce the amplitude of the fluctuation in the power-source voltage; thus, it is made possible to perform the control in such a way that the voltage to be applied to the switching device can be suppressed to a value that is the same as or lower than the withstanding voltage of the switching device.

INDUSTRIAL APPLICABILITY

The present invention can be applied to the field of an AC rotating electric machine and eventually to the field of the automobile industry in which an AC rotating electric machine is utilized as a driving source.

DESCRIPTION OF REFERENCE NUMERALS 1, 200: AC rotating electric machine
100: 1st group of armature windings
101: 2nd group of armature windings
102, 201: electric power converter
1021: 1st electric-power conversion circuit
1022: 2nd electric-power conversion circuit
103, 202: upper-arm switching device
104, 203: lower-arm switching device
105, 204: smoothing capacitor
106, 205: wiring-lead impedance
107, 206: contactor
108, 207: DC power source apparatus

The invention claimed is:

1. An AC-rotating-electric-machine control apparatus that controls an AC rotating electric machine provided with two or more independent groups of multi-phase armature windings, the AC-rotating-electric-machine control apparatus including two or more electric-power conversion circuits that control voltages that are applied to the two or more groups of multi-phase armature windings, respectively, wherein each of the two or more electric-power conversion circuits has two or more switching devices for opening or closing the corresponding group of multi-phase armature windings, for each of the phases, wherein switches included in the two or more switching devices are switching-controlled to apply opening operation or duty control to the corresponding group of multi-phase armature windings, wherein the two or more electric-power conversion circuits control respective switching timings for switching the state of the multi-phase armature windings from an all-phase short-circuiting state to an all-phase opening state such that the respective switching timings differ depending on the two or more groups of multi-phase armature windings, and wherein the two or more electric-power conversion circuits control respective switching timings for switching the state of the multi-phase armature windings from the all-phase short-circuiting state to the duty control state such that the respective switching timings differ depending on the two or more groups of multi-phase armature windings.

2. The AC-rotating-electric-machine control apparatus according to claim 1, wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings, and wherein each of the two or more groups of multi-phase armature windings is brought into the all-phase short-circuiting state when all the upper-arm switching devices or all the lower-arm switching devices in the corresponding electric-power conversion circuit are closed and is brought into the all-phase opening state when all the upper-arm switching devices or all the lower-arm switching devices in the corresponding electric-power conversion circuit are opened.

3. The AC-rotating-electric-machine control apparatus according to claim 1,
wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings, and
wherein each of the two or more groups of multi-phase armature windings is brought into the all-phase short-circuiting state when all the upper-arm switching devices or all the lower-arm switching devices in the corresponding electric-power conversion circuit are closed.

4. The AC-rotating-electric-machine control apparatus according to claim 1,
wherein each of the two or more electric-power conversion circuits has arms, in each of which an upper-arm switching device formed of the switching device and a lower-arm switching device formed of the switching device are connected in series with each other, for the respective phases of the corresponding group of multi-phase armature windings,
wherein each of the two or more groups of multi-phase armature windings is brought into the all-phase short-circuiting state when all the upper-arm switching devices or all the lower-arm switching devices in the corresponding electric-power conversion circuit are closed,
wherein each of the two or more electric-power conversion circuits switches the state of the multi-phase armature windings from the all-phase short-circuiting state to the duty control state, and
wherein when the state of the multi-phase armature windings is switched from the all-phase short-circuiting state to the duty control state, a target torque of the AC rotating electric machine is changed in accordance with the value of a motor current that flows in the all-phase short-circuiting state.

5. The AC-rotating-electric-machine control apparatus according to claim 2, wherein the switching timings are controlled in such a way that respective voltage fluctuation components in one group and in the other group, caused by the switching, are reverse to each other.

6. The AC-rotating-electric-machine control apparatus according to claim 2, wherein the respective switching timings that are controlled to differ depending on the groups of multi-phase armature windings are respective switching timings that are shifted for each of the groups by the half of an LCR resonance period based on an inductance component, a capacitance component, and a resistance component included between the electric-power conversion circuit and a power source connected with the electric-power conversion circuit.

7. The AC-rotating-electric-machine control apparatus according to claim 2,
wherein each of the two or more electric-power conversion circuits performs PWM-control of the switching device, and
wherein the switching timings that are controlled to differ depending on the groups of multi-phase armature windings are switching timings that each are controlled to become a multiple of a carrier period.

8. The AC-rotating-electric-machine control apparatus according to claim 3, wherein the switching timings are controlled such that respective voltage fluctuation components in one group and in the other group, caused by the switching, are reverse to each other.

9. The AC-rotating-electric-machine control apparatus according to claim 3, wherein the respective switching timings that are controlled in such a way as to differ depending on the groups of multi-phase armature windings are respective switching timings that are shifted for each of the groups by the half of an LCR resonance period based on an inductance component, a capacitance component, and a resistance component included between the electric-power conversion circuit and a power source connected with the electric-power conversion circuit.

10. The AC-rotating-electric-machine control apparatus according to claim 3,
wherein each of the two or more electric-power conversion circuits performs PWM-control of the switching device, and
wherein the switching timings that are controlled to differ depending on the groups of multi-phase armature windings are switching timings that each are controlled to be a multiple of a carrier period.

11. The AC-rotating-electric-machine control apparatus according to claim 4,
wherein the target torque is changed such that the motor current value becomes the same as the value of the motor current that flows in the all-phase short-circuiting state, and
wherein the changed target torque is controlled to keep track of command torque.

12. The AC-rotating-electric-machine control apparatus according to claim 5, wherein the respective switching timings that are controlled to differ depending on the groups of multi-phase armature windings are respective switching timings that are shifted for each of the groups by the half of an LCR resonance period based on an inductance component, a capacitance component, and a resistance component included between the electric-power conversion circuit and a power source connected with the electric-power conversion circuit.

13. The AC-rotating-electric-machine control apparatus according to claim 5,
wherein each of the two or more electric-power conversion circuits performs PWM-control of the switching device, and
wherein the respective switching timings that are controlled to differ depending on the groups of multi-phase armature windings are respective switching timings that each are controlled to be a multiple of a carrier period.

14. The AC-rotating-electric-machine control apparatus according to claim 8, wherein the respective switching timings that are controlled to differ depending on the groups of multi-phase armature windings are respective switching timings that are shifted for each of the groups by the half of an LCR resonance period based on an inductance component, a capacitance component, and a resistance component included between the electric-power conversion circuit and a power source connected with the electric-power conversion circuit.

15. The AC-rotating-electric-machine control apparatus according to claim 8,
   wherein each of the two or more electric-power conversion circuits performs PWM-control of the switching device, and
   wherein the switching timings that are controlled to differ depending on the groups of multi-phase armature windings are switching timings that each are controlled to be a multiple of a carrier period.

* * * * *